Feb. 12, 1935.  C. J. WERNER  1,991,036
SYSTEM OF MOTOR CONTROL
Original Filed Feb. 18, 1932   2 Sheets-Sheet 1
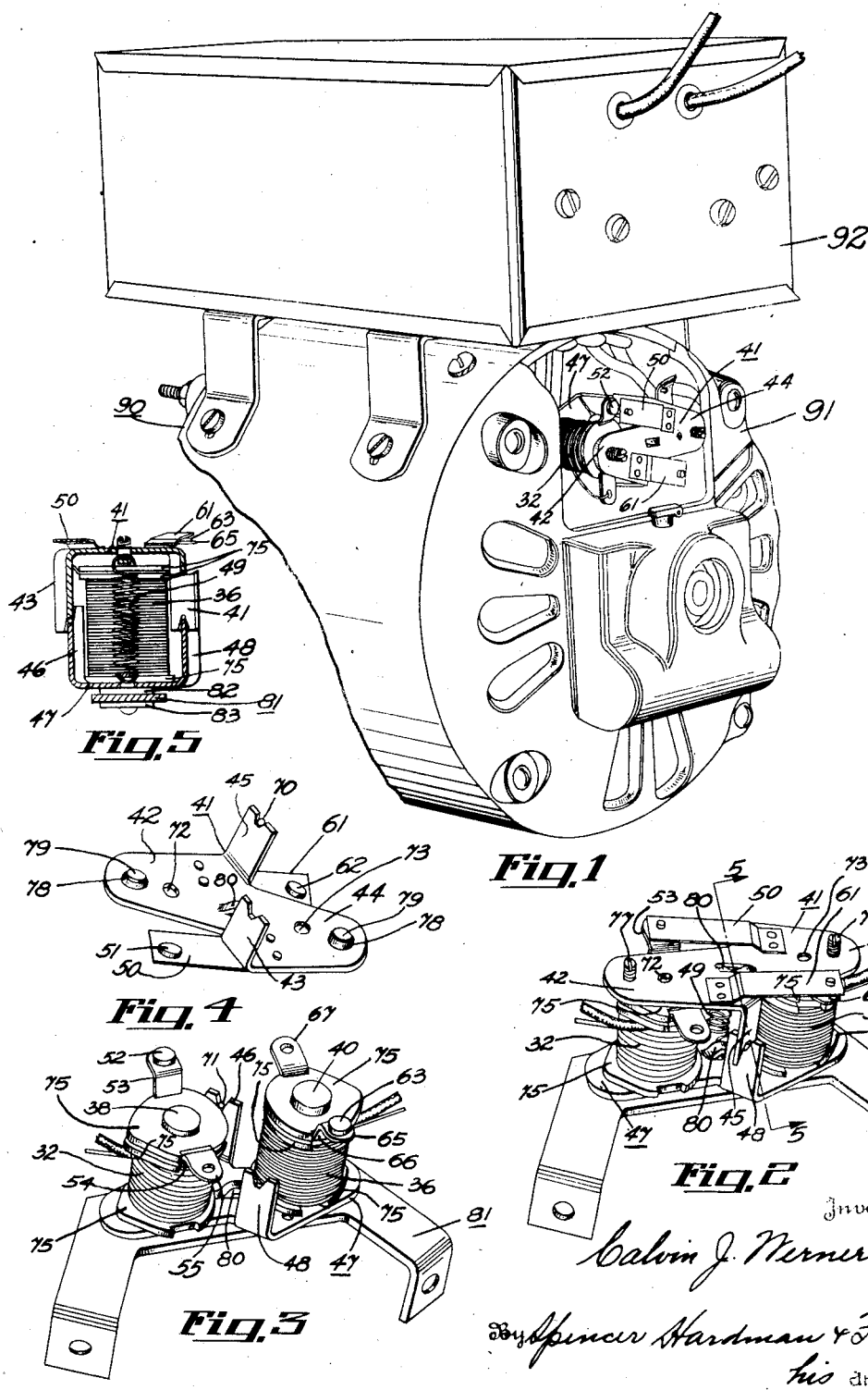

Feb. 12, 1935.   C. J. WERNER   1,991,036
SYSTEM OF MOTOR CONTROL
Original Filed Feb. 18, 1932   2 Sheets-Sheet 2

Inventor
Calvin J. Werner
By Spencer Hardman & Fehr
his Attorneys

UNITED STATES PATENT OFFICE 1,991,036

SYSTEM OF MOTOR CONTROL

Calvin J. Werner, Dayton, Ohio, assignor, by mesne assignments, to General Motors Corporation, Detroit, Mich., a corporation of Delaware Application February 18, 1932, Serial No. 593,753
Renewed February 23, 1933

22 Claims. (Cl. 172—279)

This invention relates to alternating current motors operated on a single phase current, and particularly to starting these motors by means of phase-splitting devices.

It is one of the objects of the present invention to provide a simple, reliable device which can be produced at relatively low cost for controlling the starting and running circuits covering alternating current motors operating on a single phase current.

In this connection it is a further object of the invention to provide a device which will operate the same regardless of the variations, within a reasonable range, in the voltage impressed upon the electric motor.

In the disclosed embodiment of the present invention, the control of the starting and running circuits of the motor is effected through the medium of an electromagnetic means comprising two electromagnets responsive respectively to the current in the main winding of the motor and the voltage induced in a stator winding inductively related to the rotor of the motor. These two electromagnets operate upon a common pivoted lever, one magnet operating to pull the lever in one direction and the other magnet operating to pull the lever in the opposite direction. When the motor is at rest and the current is turned on the magnet associated with the main winding of the motor is the stronger of the two magnets and operates to pull the lever into position for completing a starting circuit for the motor. As the motor speed increases, the voltage impressed upon the magnet associated with the main stator winding of the motor decreases; whereas, the voltage impressed upon the other electromagnet increases in order that the lever will be shifted in the opposite direction to complete the running circuit of the motor.

Further objects and advantages of the present invention will be apparent from the following description, reference being had to the accompanying drawings, wherein a preferred embodiment of one form of the present invention is clearly shown.

In the drawings:

Fig. 1 is a perspective view of an electric motor equipped with an apparatus embodying the present invention;

Fig. 2 is a perspective view of the electromagnetic device for controlling the starting and running circuits of the motor;

Fig. 3 is a perspective view of this device with the common operating lever removed;

Fig. 4 is a perspective view of the common operating lever shown in inverted position;

Fig. 5 is a fragmentary, sectional view on the line 5—5 of Fig. 2;

Figure 7:
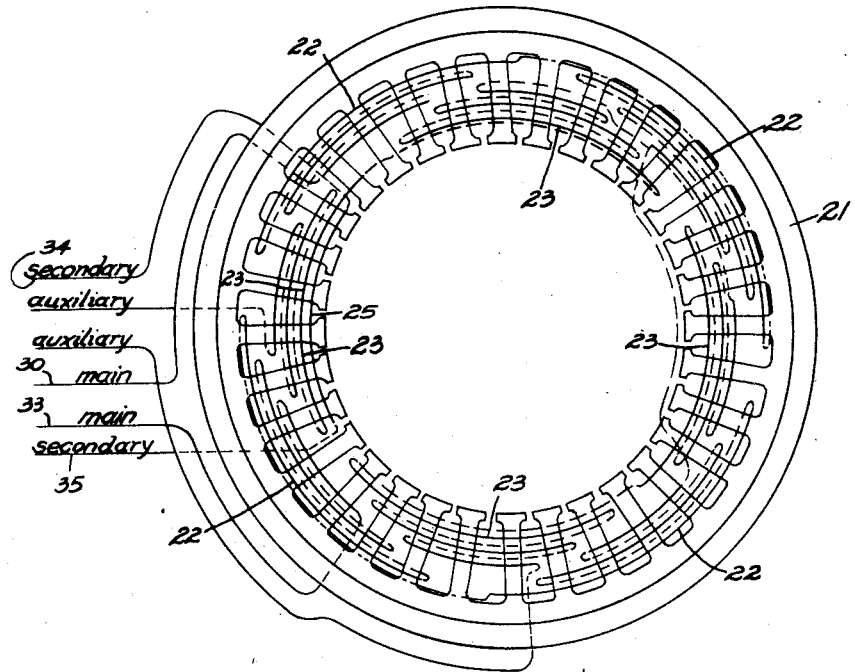
Fig. 7 is a wiring diagram of the stator of the motor.
Figure 6:
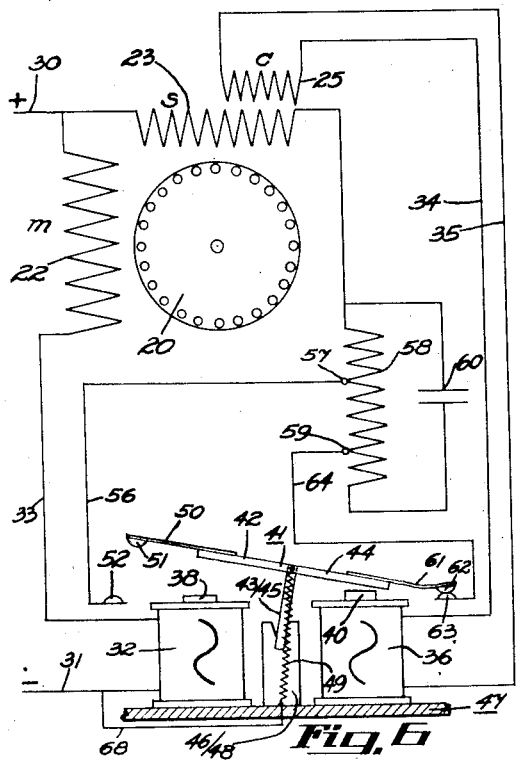
Fig. 6 is a wiring diagram illustrating the circuits connecting the electromagnetic device shown in Figs. 1 to 5 inclusive.

Referring to Figs. 6 and 7, the electric motor comprises a squirrel-cage rotor 20 cooperating with a stator 21 which includes a main winding 22 and an auxiliary winding 23 arranged as shown in Fig. 7.

The stator teeth surrounded by one part of the windings 23, are also surrounded by a secondary winding 25 which is inductively related to the rotor 20. Although the ends of the main winding 22 each surround some of the teeth that are surrounded by the secondary winding 25, there is substantially no effective linkage or coupling between the main winding 22 and the secondary winding 25, because whatever linkage there may be from each end of the main field winding are substantially equal, and are opposite in direction so that the resultant effect is substantially zero. One of the line wires 30 is connected to the main winding 22 and to the auxiliary winding 23. The other line wire 31 is connected with an electromagnet coil 32 which is in turn connected by wire 33 with the main stator winding 22. The winding 25 is connected by wires 34 and 35 with a magnet coil 36. Coils 32 and 36 surround cores 38 and 40 respectively which cooperate with lever arms 42 and 44 of a common lever 41 which is provided with two bifurcated arms 43 and 45 which straddle respectively bifurcated arms 46 and 48 of a base 47, as shown in the diagram. The lever 41 is maintained yieldingly either in a position inclined toward the core 40 or inclined toward the core 38 by spring 49 connecting the lever 41 with the base 47 and so arranged that its center line of action moves to either side of a vertical center line intersecting the pivoted lever 41 according as the lever is shifted to either of its inclined positions relative to the cores 38 or 40. The lever 41 carries a leaf spring conductor 50 carrying a contact 51 engageable with a contact 52 carried by an ear 53 extending from a bracket 54 which also carries an ear 55 to which a wire 56 is attached leading to a tap 57 connected with an intermediate winding of an auto-transformer coil 58, which is connected with the auxiliary winding 23 and with a condenser 60. The lever arm 44 carries a leaf spring conductor 61 carrying a contact 62 which cooperates with a stationary contact 63 connected by wire 64 with transformer tap 59. The contact 63 is mounted upon an ear 65 of a bracket 66 carrying also an ear 67 to which the wire 64 is attached.

Figure 8:
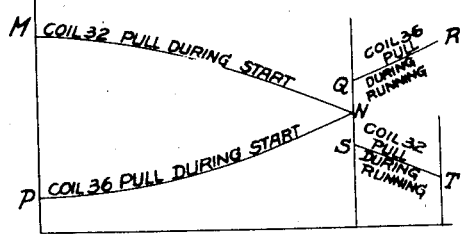
Fig. 8 is a chart showing variations with respect to speed, of the pull effected by the magnets of the electromagnetic device.
Figure 9:
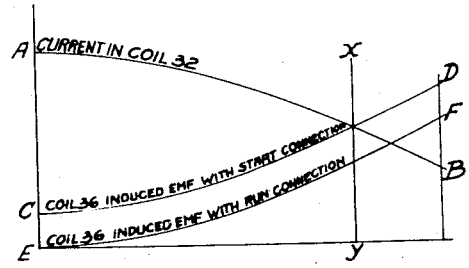
Fig. 9 is a chart showing variations with respect to speed, of the electromotive forces and current impressed upon the two electromagnets of the control device.

The base 47 with its arms 46 and 48, and the lever 41 with its arms 43 and 45, 42 and 44 are all of metallic material. Therefore, the contacts 51 and 62 may be electrically connected with the line wire 31 simply by connecting the base 47 therewith by wire 68. When the circuit in the power line is closed, the magnet 32 will be energized by the current flow through the main winding 22 and that magnet, while the magnet 36 will be energized to a considerably less degree, since the latter is connected with a winding 25 in which only a low voltage is induced. Therefore, regardless of the voltage impressed upon the main winding 22, within reasonable limits, the magnet 32 will attract the armature 42 thereby bringing contact 51 into engagement with contact 52, the engagement of these contacts being aided by the spring 49 which then will have shifted so that its center line of action is on the left hand side of the fulcrum of the lever 41. Thus the line wire 31 is connected through wire 68, parts 46 and 48, parts 43 and 45, lever 41, spring conductor 50, contacts 51 and 52, and wire 56 with the transformer tap 57. As the number of turns between the tap 57 and the end of the transformer 58 nearest the coil 23 is few in number with respect to the total number of turns of the transformer, a relatively great voltage will be impressed upon the condenser 60, thereby attaining a greater split in the phase relation between the currents in the main and auxiliary windings 22 and 23. This will improve the torque when starting. The currents induced in the rotor, however, create a magnetic field about the rotor, which field, as the rotor gains speed, cuts the conductors of the winding 25 at a rate substantially proportional to the rotor speed. The increase in the voltage induced in the winding 25 by virtue of the increase in rotor speed as the rotor starts, increases the pull of the magnet 36. Referring to Fig. 9, it will be noted that as the motor speed increases, the current in the coil 32 decreases, while the induced electro-motive force induced in coil 25 increases, as is represented by curves A—B and C—D respectively. Consequently, the pull effected by coil 32 will decrease, as represented by line M—N in Fig. 8; while the pull effected by coil 36 will increase, as represented by line P—N. At certain critical speeds represented by line x—y in Figs. 8 and 9, the pull effected by the coils 32 and 36 will be substantially equal and any increase in speed above that will result in the armature lever 41 being moved into the position shown in Fig. 6, thereby causing the contacts 51 and 52 to be separated and the contacts 62 and 63 to be engaged. When this occurs, the line wire 31 will be connected with transformer tap 59 through connections including wire 68, parts 46 and 48, parts 43 and 45, lever 41, spring conductor 61, contacts 62 and 63, and wire 64. It is quite apparent from the curves shown in Fig. 8, that in the preferred embodiment of the invention, here shown the change in the voltage induced in the winding 25 by the variations in rotor speed are necessary and desirable to effect control of the switch, since by utilizing this voltage, a wider variation of pull is obtained to accomplish the control, which gives a greater assurance of proper operation. It is also quite apparent from the same curves that whatever voltage may be induced in the winding 25 from the winding 23 is too low in value to effect operation of the switch. Furthermore, due to the reduction of the current through the winding 25 after the switching occurs in starting, the voltage induced in the winding 25 from the winding 23 has less tendency to hold the switch operated toward the magnet 36 when the rotor speed decreases due to an overload or drop in voltage, in which instance the switch will operate to the starting position. Thus coupling with the winding 23 is preferable to effective coupling with winding 22. Since the major portion of the turns of the transformer 58 is included between the tap 59 and the lead to coil 23, the transformation ratio is less than during the starting of the motor. Hence, less voltage is impressed upon the condenser 60 with the result that there is less phase-shifting and an improvement in the power factor.

Referring to Fig. 9, it will be noted that during the running of the motor the voltage induced in secondary winding 25 effecting the energization of coil 36 is less than during the starting, as represented by line E—F. However, the relay coil 36 pulls with much stronger effect upon the lever 44 than the coil 32 does upon the lever 42 as represented by curves Q—R and S—T in Fig. 8.

Referring to Figs. 2 to 6, the double magnet relay illustrated diagrammatically in Fig. 6 is so constructed and arranged that its armature lever 41 and its base 47 can be made of like stampings of sheet metal. The leg 45 of lever 41 is provided with a notch into which a ball 70 is press-fitted and which is received by the leg 48 of the base 47. Likewise the leg 46 of base 47 is provided with a notch into which a ball 71 is press-fitted, said ball providing a bearing for the leg 43 of lever 41. In other words, the construction provides pairs of legs having bifurcated ends which straddle one another, each pair of legs consisting of a leg supporting the armature lever 41 and a leg extending upwardly from the base 47. An antifriction joint is provided between the members of each pair of legs by a ball which is press-fitted into a notch carried by one of the members of the pair of legs.

The base 47 supports the cores 38 and 40, the lower ends of which are fitted into holes provided by the base 47. Since the lever 41 is a counter part of the base 47, holes 72 and 73 are provided therein but serve no purpose as far as the lever 41 is concerned; but, where the piece is used to provide the base 47, the holes 72 and 73 receive the cores 38 and 40 respectively. Each of the cores 38 and 40 carries three similar insulation pieces 75. Between the lowermost piece 75 and the intermediate piece 75 is located a magnet winding which the pieces 75 insulate from adjacent metallic parts. Between the uppermost piece 75 and the intermediate piece 75 is located one of the brackets 54 or 66. The arms 42 and 44 of the lever 41 each carry an adjustable screw 77, the lower end of which terminates in a head 78 carrying a felt pad 79 which strikes against the uppermost insulation piece 75. By turning the screws 77 the extent of approach of either of the lever arms 42 and 44 to the cores 38 or 40, respectively, can be adjusted. It will be noted that each of the parts 41 and 47 is provided with an integral eye 80 to which an end of the spring 49 is attached.

The base 47 is attached to a mounting bracket 81 and is insulated therefrom by insulating plates 82 and 83 shown in Fig. 5. The bracket 81 provides a convenient means for attaching the double magnet relay to the end frame 91 of an electric motor 90. The frame of the motor 90 supports a box 92 within which the condenser 60 and the auto-transformer coil 58 are located.

While the form of embodiment of the present invention as herein disclosed, constitutes a preferred form, it is to be understood that other forms might be adopted, all coming within the scope of the claims which follow.

What is claimed is as follows.

1. A system of motor control which comprises, in combination, an alternating current motor having main and auxiliary field windings and a rotor, a secondary winding effectively interlinked magnetically with the rotor and with only the auxiliary winding, and means for controlling the auxiliary winding in relation to the voltage induced in the secondary winding by the rotor flux, and including an electromagnet connected with the main winding and an opposing electromagnet connected with the secondary winding.

2. A system of motor control which comprises, in combination, an alternating current motor having main and auxiliary field windings and a rotor, a secondary winding effectively interlinked magnetically with the rotor and with only the auxiliary winding, an impedance in circuit with the auxiliary winding, and means for controlling the impedance in response to the voltage induced in the secondary winding by the rotor flux and including an electromagnet connected with the main winding and an opposing electromagnet connected with the secondary winding.

3. A system of motor control which comprises, in combination, an alternating current motor having main and auxiliary field windings and a rotor, a secondary winding effectively interlinked magnetically with the rotor and with only the auxiliary winding, a condenser in circuit with the auxiliary winding, and means for controlling the condenser responsively to variations in voltage across the secondary winding effected by variations in rotor speed and including an electromagnet connected with the main winding and an opposing electromagnet connected with the secondary winding.

4. A system of motor control which comprises, in combination, an alternating current motor having main and auxiliary field windings and a rotor, a secondary winding effectively interlinked magnetically with the rotor and with only the auxiliary winding, a condenser in circuit with the auxiliary winding, and means for controlling the voltage impressed upon the condenser in response to rotor speed, and including an electromagnet connected with the main winding and an opposing electromagnet connected with the secondary winding.

5. A system of motor control which comprises, in combination, an alternating current motor having main and auxiliary field windings and a rotor, a secondary winding effectively interlinked magnetically with the rotor and with only the auxiliary winding, a condenser in circuit with the auxiliary winding, a transformer for controlling the voltage impressed upon the condenser, and means for controlling the transformer in response to rotor speed and including an electromagnet connected with the main winding and an opposing electromagnet connected with the secondary winding.

6. A system of motor control which comprises, in combination, an alternating current motor having main and auxiliary field windings and a rotor, a secondary winding effectively interlinked magnetically with the rotor and with only the auxiliary winding, a condenser in circuit with the auxiliary winding, an auto-transformer for controlling the voltage impressed upon the condenser, said transformer having a plurality of taps, and means for connecting one or another of said taps in circuit with a current source responsive to the magnitude of the rotor flux and to rotor speed and including an electromagnet connected with the main winding and an opposing electromagnet conected with the secondary winding.

7. A system of motor control which comprises, in combination, an alternating current motor having main and auxiliary field windings and a rotor, a secondary winding interlinked magnetically with the rotor and having some magnetic linkage with the auxiliary winding, and means for controlling the auxiliary winding, said means including a unitary magnetic device having a base and an armature lever made of like parts, each part having legs pivotally supported respectively by the legs of the other part, two electromagnets carried by the base, one on each side of the armature pivots, one of the electromagnets being connected to the secondary winding so as to be responsive to the voltage induced in the secondary winding from the rotor, a coiled spring connecting the armature lever and base, said spring being arranged so that its center line of action moves to either side of the armature pivots as the armature is oscillated, and a switching device operated by the armature.

8. A system of motor control which comprises, in combination, an alternating current motor having main and auxiliary field windings and a rotor, a secondary winding interlinked magnetically with the rotor, means for controlling the auxiliary winding, said means including a unitary magnetic device having a base and an armature lever made of like parts, each part having notched legs pivotally supported respectively by the legs of the other part, two electromagnets carried by the base, one on each side of the armature pivots, one of said electromagnets being responsive to the current in the main field winding, and the other of said electromagnets being responsive to the voltage induced in the secondary winding by virtue of said magnetic linkage with the rotor, a coiled spring connecting the armature lever and base, said spring being arranged so that its center line of action moves to either side of the armature pivots as the armature is oscillated, and a switching device operated by the armature.

9. A system of motor control which comprises, in combination, an alternating current motor having main and auxiliary field windings and a rotor, a secondary winding interlinked magnetically with the rotor, means for controlling the auxiliary winding, said means including a unitary magnetic device having a base and an armature lever made of like parts, each part having notched legs pivotally supported respectively by the legs of the other part, two balls retained respectively by a leg of the lever and a leg of the base, each ball providing an auto-friction bearing for a leg of the lever or base, two electromagnets carried by the base, one on each side of the armature pivots, one of said electromagnets being connected to the main field winding, and the other of said electromagnets being connected across the secondary winding, a coiled spring connecting the armature lever and base, said spring being arranged so that its center line of action moves to either side of the armature pivots as the armature is oscillated, and a switching device operated by the armature.

10. A system of motor control for a motor having a rotor and a stator, comprising in combination, a plurality of stator windings including a plurality of field windings, and a third winding magnetically coupled with the rotor and having less effective magnetic coupling with one of said field windings than with the other; a starting circuit; a running circuit; a switch for switching from the starting circuit to the running circuit; and electromagnets for controlling the switch, one of said electromagnets being controlled by the current through one of the field windings, and the other of said electromagnets being controlled by the potential across the third winding.

11. A system of motor control for a motor having a rotor and a stator, comprising in combination, a plurality of stator windings including a main field winding, an auxiliary field winding, and a third winding, said third winding being magnetically coupled to the rotor and having less effective magnetic coupling with the main field winding than with the auxiliary field winding; a starting circuit; a running circuit; and means for switching from the starting circuit to the running circuit when a predetermined rotor speed is reached, said means including electromagnets, one of said electromagnets being connected in the circuit of the main field winding, and the other of said electromagnets being connected to the third winding.

12. A system of motor control for a motor having a rotor and a stator, comprising in combination, a plurality of stator windings including a main field winding, an auxiliary field winding, and a third winding, said third winding being effectively magnetically coupled with the rotor and with only one of the field windings; a starting circuit; a running circuit; and means for switching from the starting circuit to the running circuit when a predetermined rotor speed is reached, said means including electromagnets, one of said electromagnets being connected to the main field winding, and the other of said electromagnets being connected to the third winding.

13. A system of motor control for a motor having a rotor and a stator, comprising in combination, a plurality of field windings including a main and an auxiliary field winding; a third winding magnetically associated with the rotor and substantially concentric circumferentially with respect to a portion of the auxiliary winding, the potential across said third winding being mainly controlled by the rate at which the rotor flux cuts the said third winding; a starting circuit; a running circuit; and a switch having start and run positions for controlling the starting and running circuits in accordance with the rotor speed, said switch being electromagnetically operated and having an electromagnet in series with the main field winding for moving the switch to the start position, and another electromagnet connected to the third winding for moving the switch to the run position.

14. A system of motor control for a motor having a rotor and a stator, comprising in combination, a plurality of field windings including a main and an auxiliary field winding; a third winding magnetically associated with the rotor and having less effective magnetic coupling with one of the field windings than with the other; a starting circuit; a running circuit; and a switch having start and run positions for controlling the starting and running circuits in accordance with the rotor speed, said switch being electromagnetically operated and having an electromagnet in the circuit of the main field winding for moving the switch to the start position, and another electromagnet connected to the third winding for moving the switch to the run position.

15. A system of motor control for a motor having a rotor and a stator, comprising in combination a plurality of stator windings including a plurality of field windings and a third winding, said third winding being magnetically associated with the rotor and having less effective magnetic coupling with one of the field windings than with the other; a starting circuit; a running circuit; a switch having start and run positions for controlling the starting and running circuits; and means responsive to the current through one of the field windings as well as means responsive to the potential across the third winding for controlling the switch.

16. A system of motor control for a motor having a rotor and a stator, comprising in combination, a plurality of stator windings including main and auxiliary field windings and a third winding, said third winding being effectively magnetically coupled with the rotor and with only the auxiliary winding; a starting circuit; a running circuit; a switch for controlling the starting and running circuits; and means responsive to the current through the main field winding and the potential across the third winding for controlling the switch.

17. A system of motor control for a motor having a rotor and a stator, comprising in combination, main and auxiliary field windings; a third winding directly magnetically coupled to the rotor and having less effective magnetic coupling with the main field winding than with the auxiliary field winding; a starting circuit; a running circuit; a switch having start and run positions for controlling the starting and running circuits; means responsive to the current thru the main field winding for moving the switch to the start position; and means responsive to the potential across the third winding for moving the switch to the run position.

18. A system of motor control for a motor having a rotor and a stator, comprising in combination, main and auxiliary field windings; a third winding directly magnetically coupled to the rotor and effectively magnetically coupled with only the auxiliary winding; a starting circuit; a running circuit; a switch having start and run positions for controlling and starting and running circuits; a pair of electromagnets cooperating with a common armature for effecting movement of the switch to the start and run positions, one of said electromagnets being responsive to the current through the main field winding for moving the switch to the start position, and the other of said electromagnets being responsive to the change of potential across the third winding effected by the rotor flux and change of rotor speed for moving the switch to the run position.

19. A system of motor control for a motor including a stator having slots therein and a rotor, comprising, in combination, a plurality of stator windings in said slots and including main and auxiliary field windings displaced substantially 90 electrical degrees from each other and a third winding magnetically associated with the rotor and substantially concentric with the auxiliary winding; a starting circuit; a running circuit; a switch having start and run positions for controlling the starting and running circuits; means responsive to the current through the main field winding for moving the switch to the start position; and means responsive to the voltage induced in the third winding by the rotor flux for moving the switch to the run position.

20. A system of motor control for a motor having a rotor and a stator comprising, in combination, main and auxiliary field windings; a secondary winding magnetically associated with the rotor and substantially concentric with the auxiliary field winding; a starting circuit; a running circuit; a switch having start and run positions for controlling the starting and running circuits; means for actuating the switch to the start position; and means responsive to the voltage induced in the third winding by the rotor flux for moving the switch to the run position.

21. A system of motor control for a motor adapted to be connected to a power supply line and having a rotor and a stator, comprising, in combination, a plurality of stator windings including main and auxiliary field windings and a third winding; a switch having cooperating contacts and a pair of electromagnets for controlling the contacts, said contacts being connected intermediate the auxiliary field winding and the power supply line to close the circuit to that winding for starting the motor, and one of said electromagnets being connected in series with the main field winding to effect the closing of said contacts; the other of said electromagnets being connected to the third winding and effecting the opening of the contacts when the rotor reaches substantially a predetermined speed.

22. A control system for a motor adapted to be connected to a power supply line and having a rotor and a stator, comprising in combination, a plurality of stator windings including main and auxiliary field windings, and a third winding magnetically coupled with the rotor and to the auxiliary field winding; a starting circuit including a condenser connected in series with the auxiliary field winding and to the power supply line; a running circuit; and means for controlling the starting and running circuits including a pair of electromagnets, one of said electromagnets being connected in series with the main field winding and the other being connected across the third winding.

CALVIN J. WERNER.